United States Patent
Thompson et al.

(10) Patent No.: US 10,075,385 B1
(45) Date of Patent: Sep. 11, 2018

(54) SYSTEMS AND METHODS FOR DISCOVERING AND DOWNLOADING CONFIGURATION FILES FROM PEER NODES

(71) Applicant: Crimson Corporation, Dover, DE (US)

(72) Inventors: Blake Alan Thompson, Saratoga Springs, UT (US); Gregory Paul Olsen, Lindon, UT (US); Rex McMillan, South Jordan, UT (US)

(73) Assignee: Ivanti, Inc., South Jordan, UT (US)

( * ) Notice: Subject to any disclaimer, the term of this patent is extended or adjusted under 35 U.S.C. 154(b) by 300 days.

(21) Appl. No.: 14/332,733

(22) Filed: Jul. 16, 2014

(51) Int. Cl.
*G06F 13/00* (2006.01)
*H04L 12/911* (2013.01)

(52) U.S. Cl.
CPC .................. *H04L 47/70* (2013.01)

(58) Field of Classification Search
CPC ............ H04L 12/5695; H04L 29/06; H04L 29/08072; H04L 29/08144; H04L 29/08171; H04L 29/08981; H04L 41/12; H04L 41/0806; H04L 47/70
USPC .................................. 709/220, 226
See application file for complete search history.

(56) References Cited

U.S. PATENT DOCUMENTS

| | | | |
|---|---|---|---|
| 6,167,567 A | 12/2000 | Chiles et al. | |
| 6,223,209 B1 | 4/2001 | Watson | |
| 6,611,850 B1 | 8/2003 | Shen | |
| 7,363,480 B1 | 4/2008 | Right et al. | |
| 9,465,600 B2 | 10/2016 | Matthew et al. | |
| 2002/0078188 A1 | 6/2002 | Anand et al. | |
| 2003/0005276 A1 | 1/2003 | French et al. | |
| 2003/0163583 A1 | 8/2003 | Tarr | |
| 2003/0163702 A1 | 8/2003 | Vigue et al. | |
| 2004/0107242 A1 | 6/2004 | Vert et al. | |
| 2005/0010663 A1 | 1/2005 | Tatman et al. | |
| 2007/0074019 A1 | 3/2007 | Seidel | |
| 2007/0101135 A1 | 5/2007 | Saba et al. | |
| 2007/0198819 A1 | 8/2007 | Dickens et al. | |
| 2007/0266120 A1 | 11/2007 | Tallieu et al. | |
| 2008/0130639 A1* | 6/2008 | Costa-Requena | G06F 8/65 370/389 |
| 2008/0133650 A1* | 6/2008 | Saarimaki | G06F 8/65 709/203 |

(Continued)

OTHER PUBLICATIONS

Office Action for U.S. Appl. No. 14/256,809, dated Nov. 2, 2016, 14 pages.

(Continued)

*Primary Examiner* — Robert B Harrell

(57) ABSTRACT

A method for provisioning a managed node is described. The method includes obtaining data indicating a set of resources to be downloaded. The data corresponds to a designated configuration. The method also includes sending parallel resource existence requests to peer nodes for one or more resources in the set of resources. The resource existence requests are sent within a managed network. The method further includes determining if one or more responses from the peer nodes are received. The method additionally includes downloading at least one resource from at least one of the peer nodes if at least one response is received indicating that at least one peer node has a requested resource. The method also includes downloading any remaining resource from an administrative system.

21 Claims, 9 Drawing Sheets

(56) References Cited

U.S. PATENT DOCUMENTS

| | | |
|---|---|---|
| 2008/0313450 A1 | 12/2008 | Rosenberg |
| 2009/0094352 A1 | 4/2009 | Sharma et al. |
| 2009/0106549 A1 | 4/2009 | Mohamed |
| 2009/0125569 A1 | 5/2009 | Achtermann et al. |
| 2009/0271595 A1 | 10/2009 | Barsness et al. |
| 2010/0332579 A1 | 12/2010 | Sengupta et al. |
| 2011/0071841 A1 | 3/2011 | Fomenko et al. |
| 2011/0185047 A1* | 7/2011 | Vaidyanathan ..... H04L 41/0893 709/220 |
| 2011/0276671 A1 | 11/2011 | Cain et al. |
| 2011/0320800 A1 | 12/2011 | Azam et al. |
| 2012/0005321 A1 | 1/2012 | Hu et al. |
| 2012/0072723 A1 | 3/2012 | Orsini et al. |
| 2012/0158876 A1 | 6/2012 | She |
| 2012/0164974 A1 | 6/2012 | Eriksson et al. |
| 2013/0145042 A1 | 6/2013 | Sen et al. |
| 2013/0198332 A1 | 8/2013 | Van Ackere et al. |
| 2014/0095605 A1 | 4/2014 | Varvello et al. |
| 2015/0106608 A1 | 4/2015 | Brundidge et al. |
| 2015/0186668 A1 | 7/2015 | Whaley et al. |
| 2015/0256345 A1 | 9/2015 | Vald et al. |
| 2016/0202964 A1 | 7/2016 | Butcher et al. |

OTHER PUBLICATIONS

Office Action for U.S. Appl. No. 14/256,809, dated May 17, 2017, 14 pages.

Office Action for U.S. Appl. No. 14/332,737, dated May 20, 2016, 8 pages.

Office Action for U.S. Appl. No. 14/332,737, dated Sep. 20, 2016, 9 pages.

Office Action for U.S. Appl. No. 14/332,737, dated Feb. 10, 2017, 11 pages.

Office Action for U.S. Appl. No. 14/332,737, dated Aug. 8, 2017, 12 pages.

Office Action for U.S. Appl. No. 14/992,774 dated Apr. 11, 2017, 12 pages.

Office Action for U.S. Appl. No. 14/992,774 dated Aug. 28, 2017, 16 pages.

* cited by examiner

SYSTEMS AND METHODS FOR DISCOVERING AND DOWNLOADING CONFIGURATION FILES FROM PEER NODES

TECHNICAL FIELD

The present invention relates generally to computers and computer-related technology. More specifically, the present invention relates to systems and methods for provisioning a managed node.

BACKGROUND

Computer and communication technologies continue to advance at a rapid pace. Indeed, computer and communication technologies are involved in many aspects of a person's day. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. Most companies have one or more computer networks and also make extensive use of the Internet. The productivity of employees often requires human and computer interaction. Improvements in computers and software have been a force for bringing about great increases in business and industrial productivity.

Procedures for installing hardware, installing software, and/or fixing problems with computers may consume resources, such as time and system bandwidth. For example, system administrators often have to spend time installing software on computers. As shown from the above discussion, it may be beneficial to improve installation and/or maintenance procedures for computers.

DETAILED DESCRIPTION

Figure 1:
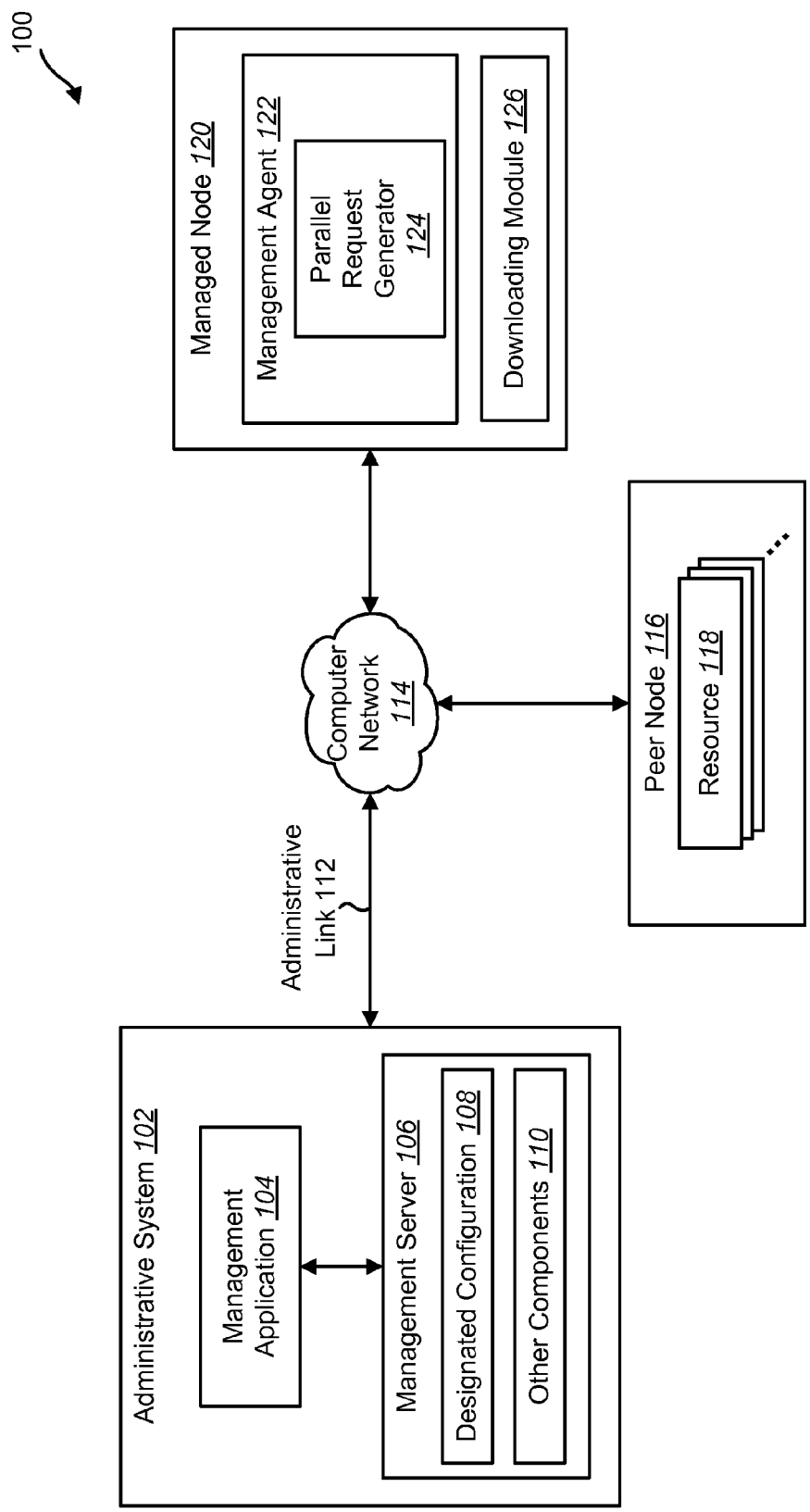
FIG. 1 is a block diagram illustrating one configuration of a managed network in which some configurations of the systems and methods disclosed herein may be implemented.

A method for provisioning a managed node is described. The method includes obtaining data indicating a set of resources to be downloaded. The data corresponds to a designated configuration. The method also includes sending parallel resource existence requests to peer nodes for one or more resources in the set of resources. The resource existence requests are sent within a managed network. The method further includes determining if one or more responses from the peer nodes are received. The method additionally includes downloading at least one resource from at least one of the peer nodes if at least one response is received indicating that at least one peer node has a requested resource. The method also includes downloading any remaining resource from an administrative system.

The data indicating the set of resources to be downloaded may be obtained from the administrative system. The data indicating the set of resources to be downloaded may be obtained from a portable storage device. The data indicating the set of resources to be downloaded may be obtained when the managed node connects to the managed network.

Multiple responses may be received for a single resource. The method may include downloading the resource from a peer node that is first to respond or a peer node that meets a criterion of a resource priority utility.

The designated configuration may be generated by the administrative system. The administrative system may include a configuration utility.

Any remaining resources may be downloaded through an administrative link. The data indicating the set of resources to be downloaded may be generated by the administrative system. The administrative system may periodically check the peer nodes for the designated configuration. The data indicating a set of resources to be downloaded may be obtained when the managed node is in a pre-boot configuration.

A computing device configured for provisioning the computing device is also described. The computing device includes a processor. The computing device also includes a memory in electronic communication with the processor. The computing device further includes instructions stored in the memory. The instructions are executable to obtain data indicating a set of resources to be downloaded. The data corresponds to a designated configuration. The instructions are also executable to send parallel resource existence requests to peer nodes for one or more resources in the set of resources. The resource existence requests are sent within a managed network. The instructions are further executable to determine if one or more responses from the peer nodes are received. The instructions are additionally executable to download at least one resource from at least one of the peer nodes if at least one response is received indicating that at least one peer node has a requested resource. The instructions are also executable to download any remaining resource from an administrative system.

A non-transitory, tangible computer-readable medium for provisioning a managed node is also described. The computer-readable medium includes executable instructions for obtaining data indicating a set of resources to be downloaded. The data corresponds to a designated configuration. The computer-readable medium also includes executable instructions for sending parallel resource existence requests to peer nodes for one or more resources in the set of resources. The resource existence requests are sent within a managed network. The computer-readable medium further includes executable instructions for determining if one or more responses from the peer nodes are received. The computer-readable medium additionally includes executable instructions for downloading at least one resource from at least one of the peer nodes if at least one response is received indicating that at least one peer node has a requested resource. The computer-readable medium also includes executable instructions for downloading any remaining resource from an administrative system.

The systems and methods disclosed herein may provide approaches for provisioning a managed node using peers. For example, provisioning a computer may require an image of a drive (e.g., hard disk) that contains all the files that represent the operating system and applications on a computer. These images can get very large (e.g., several hundred gigabytes of information). For companies with remote offices that have slow network links, it can take a very long time to transfer the necessary image file(s) across a Wide Area Network (WAN) link to the computers at the remote site. For example, known techniques use large images to image a computer.

However, the systems and methods disclosed herein may enable avoiding transferring some, most or all of the data across the WAN. For example, the systems and methods disclosed herein may leverage the fact that many of the files necessary to provision a computer may be redundant across peer computers. For example, the operating system may include the same core files on all computers. In known approaches, provisioning relies on images that contain all the files necessary to run a computer, including the operating system files and standard application files, etc. Since many of the files that make up an operating system may be the same from computer to computer, the systems and methods disclosed herein may instead fetch the data from a local peer computer rather than reaching across the WAN link or another slow link to fetch an entire image of the files. Known approaches may not use peers to harvest the files necessary.

In one example of the systems and methods disclosed herein, a utility may be run (remotely and/or locally, for example) to generate a list of all the files and their installed location on a designated (e.g., "gold") computer. The designated computer may have a particular (e.g., desired) computer setup (e.g., a "designated configuration."). Additionally or alternatively, the list may be generated from a traditional image file that is mounted somewhere. The list may only need to be generated once, but may also be updated if newer files are released over time. This list may be much smaller in size compared to that of the sum of all the actual files on the computer. The list may be sent to the computer that is being provisioned. The computer may be booted into a pre-boot environment such as WinPE. An agent in that environment may process the list and may send out requests to one or more peer computers for the files required. For example, a downloader may allow multiple peers to be queried and respond in parallel to requests for files. Thus, large amounts of data can be quickly sent to the machine being provisioned, which may be much faster than the slow stream over the WAN or slow link. Any files that are not found on one or more peers for any reason may be logged during the process and sent back to the "core" or machine running the provisioning process (that may be controlled by an administrator, for example). Those files may then be streamed over the WAN link from a gold image to the machine being provisioned. This may be a much smaller subset of files and may take much less time than the entire image file.

Various configurations of the systems and methods disclosed herein are now described with reference to the Figures, where like reference numbers may indicate identical or functionally similar elements. The systems and methods disclosed herein, as generally described and illustrated in the Figures herein, could be arranged and designed in a wide variety of different configurations. Thus, the following more detailed description of several configurations of the systems and methods, as represented in the Figures, is not intended to limit the scope of the systems and methods, as claimed, but is merely representative of the configurations of the systems and methods.

Many features of the configurations disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may include a single instruction, or many instructions, and may be distributed over several different code segments, among different programs, and across several memory devices.

FIG. 1 is a block diagram illustrating one configuration of a managed network 100 in which some configurations of the systems and methods disclosed herein may be implemented. The managed network 100 may include an administrative system 102 that is connected to a computer network 114 through an administrative link 112. Examples of the managed network 100 include local area networks (LANs), wide area networks (WANs) and combinations thereof. For instance, the managed network 100 may be a corporate network or a home network. The administrative system 102 may manage other computing devices that are also connected to the computer network 114. These other computing devices may include one or more managed nodes 120 and one or more peer nodes 116. A managed node 120 may be configured to more efficiently obtain resources 118 needed to provision a managed node 120 by attempting to obtain the resources 118 from other peer nodes 116 instead of directly from an administrative system 102. In general, any node may operate as either a managed node 120 or a peer node 116.

The administrative system 102 may include a management server 106. The management server 106 may be the location of the tools and programs that a management application 104 may use during the process of provisioning a managed node 120. The management server 106 may include a designated configuration 108. The designated configuration 108 may be a software configuration template. For example, the designated configuration 108 may include software (e.g., executable code and/or data) and/or information indicating software for installation on the one or more managed nodes 120. Examples of software for installation include operating systems, programs, applications, routines, definitions, executable code, data, etc. Accordingly, the designated configuration 108 may include one or more files for provisioning a managed node 120. For example, the designated configuration 108 may be an image of a drive or hard disk of a computing device (e.g., a peer node 116 or other computing device). In some implementations, one or more of the managed nodes 120 may be required to conform to the designated configuration 108.

In some cases, the designated configuration 108 may be a configuration that is currently being used as a template for any managed nodes 120 that are to be connected to the managed network 100. For instance, the designated configuration 108 could be a configuration that mirrors another managed node 120 and/or peer node 116 that is located within the same managed network 100. In another example, the designated configuration 108 could be a configuration that mirrors a managed node that is located within a different managed network.

In some implementations, the administrative system 102 may include and/or send data that indicates a set of resources to be downloaded. For example, the designated configuration 108 may be used to create the data indicating a set of resources 118 to be downloaded by a managed node 120 for provisioning. The data indicating a set of resources 118 to be downloaded may indicate a set of resources 118 intended to provision a managed node 120 in accordance with the designated configuration 108. In some configurations, a resource 118 may be a file and/or a file path where a file is stored on a system (e.g., peer node 116). Examples of resources 118 include new software and updates to software (e.g., an operating system update that may be installed on the managed node 120). The management server 106 may also include various other components 110 that are configured to perform tasks such as scheduling, handling alerts and so forth. An example of a management server 106 that may be used with the configurations disclosed herein is the core server for the LANDesk® Management Suite.

The administrative system 102 may also include a management application 104. The management application 104 may perform various tasks related to the management of the managed network 100, such as remote control, software distribution, software license monitoring, operating system imaging and migration, Information Technology (IT) asset management, problem resolution and so forth. As part of performing these tasks, the management application 104 may connect to the management server 106 and query the management server 106 for information. An example of a management application 104 that may be used is the console application for the LANDesk® Management Suite. Although a management server 106 is shown in the configuration depicted in FIG. 1, not all configurations require a management server 106. It should also be noted that the management application 104 may be included in and run on the management server 106 in some configurations. In other configurations, the management application 104 may be included in and run on another computing device included in the administrative system 102.

The administrative system 102 may be connected and accessed through an administrative link 112. For example, the administrative link 112 may carry information (e.g., commands, data, software, reports, etc.) between the administrative system 102 and any (e.g., all) of the one or more managed nodes 120 and/or the one or more peer nodes 116. Accordingly, the administrative link 112 may carry a relatively large traffic load in some cases. Latency issues may result from the large traffic load on the administrative link 112. For example, the administrative link 112 may typically carry more traffic than a link between the managed node 120 and a peer node 116. Additionally or alternatively, the administrative system 102 may be located farther from the managed node 120 in comparison to a peer node 116. Accordingly, sending and/or receiving data may be slower over the administrative link 112 than over a peer link.

Additionally or alternatively, there may be more network hardware (e.g., routers, switches and/or gateways, etc.) and/or more network hops in-between the managed node 120 and the administrative system 102, which may slow the administrative link 112. In some implementations, the administrative link 112 may be over a WAN (e.g., the Internet), while a peer link may be over a LAN.

The systems and methods disclosed herein may enable provisioning a managed node 120 more quickly. For example, if a managed node 120 were provisioned entirely over the administrative link 112, the delays and traffic restrictions of the administrative link 112 may slow the download of resources. In accordance with the systems and methods disclosed herein, however, a managed node 120 may be partially or fully provisioned over one or more peer links. This may speed up the download of one or more resources 118, since a peer link may offer higher speeds, more bandwidth, reduced delay and/or less traffic in comparison to the administrative link 112.

The managed node 120 may include a management agent 122. The management agent 122 may include executable code for performing one or more operations. For example, the management agent 122 may be an application (e.g., program) running on the managed node 120. In some cases, the management agent 122 may perform management-related tasks in response to requests from the management application 104. In some configurations, the management agent 122 may be capable of running in a pre-boot environment. For example, the management agent 122 may operate without an operating system installed and/or running on the managed node 120. Accordingly, the management agent 122 may perform operations before an operating system has been installed and/or booted on the managed node 120. The management agent 122 may also operate with an operating system installed and/or booted on the managed node 120.

The management agent 122 may include a parallel request generator 124 to send one or more requests and/or to receive one or more responses. In some configurations, multiple requests may be sent concurrently and/or multiple responses may be received concurrently. For example, a parallel request generator 124 may send multiple requests for a resource 118 to multiple peer nodes 116. For instance, the parallel request generator 124 may broadcast a request for one or more resources 118 to all of the peer nodes 116. In another example, a parallel request generator 124 may send a request for multiple resources 118 to a single peer node 116. The management agent 122 may originate discovery threads, download threads and/or resource existence requests. An example of a management agent 122 that may be used is the LANDesk® Management Agent. It should be noted that the terms "concurrent," "simultaneous" and variations thereof may mean that two or more events may overlap in time and may or may not occur at exactly the same time. Additionally, concurrent events may or may not begin and or end at the same time.

The managed node 120 may include a downloading module 126. The downloading module 126 may be included in the management agent 122 or may be separate from the management agent 122. The downloading module 126 may download and/or process one or more resources (e.g., files) from one or more peer nodes 116, one or more managed nodes 120 and/or an administrative system 102. For example, the downloading module 126 may receive and store one or more resources (e.g., resources 118) for installation on the managed node 120. In some configurations, the downloading module 126 may decompress one or more resources (e.g., resources 118) from one or more peer nodes 116, managed nodes 120 and/or the administrative system 102.

As illustrated in FIG. 1, one or more peer nodes 116 may be connected to the same computer network 114 as the managed node 120 and the administrative system 102. In some configurations, one or more peer nodes 116 may be within the same subnet as the managed node 120 or located within a different subnet. As described above, the peer node 116 may include one or more resources 118 that the managed node 120 may download to provision the managed node 120. Examples of the one or more resources 118 may include software, programs, applications, operating systems, definitions, data, etc. The one or more peer nodes 116 may also be managed nodes (e.g., the administrative system 102 may also manage the peer node(s) 116) in some implementations.

Figure 2:
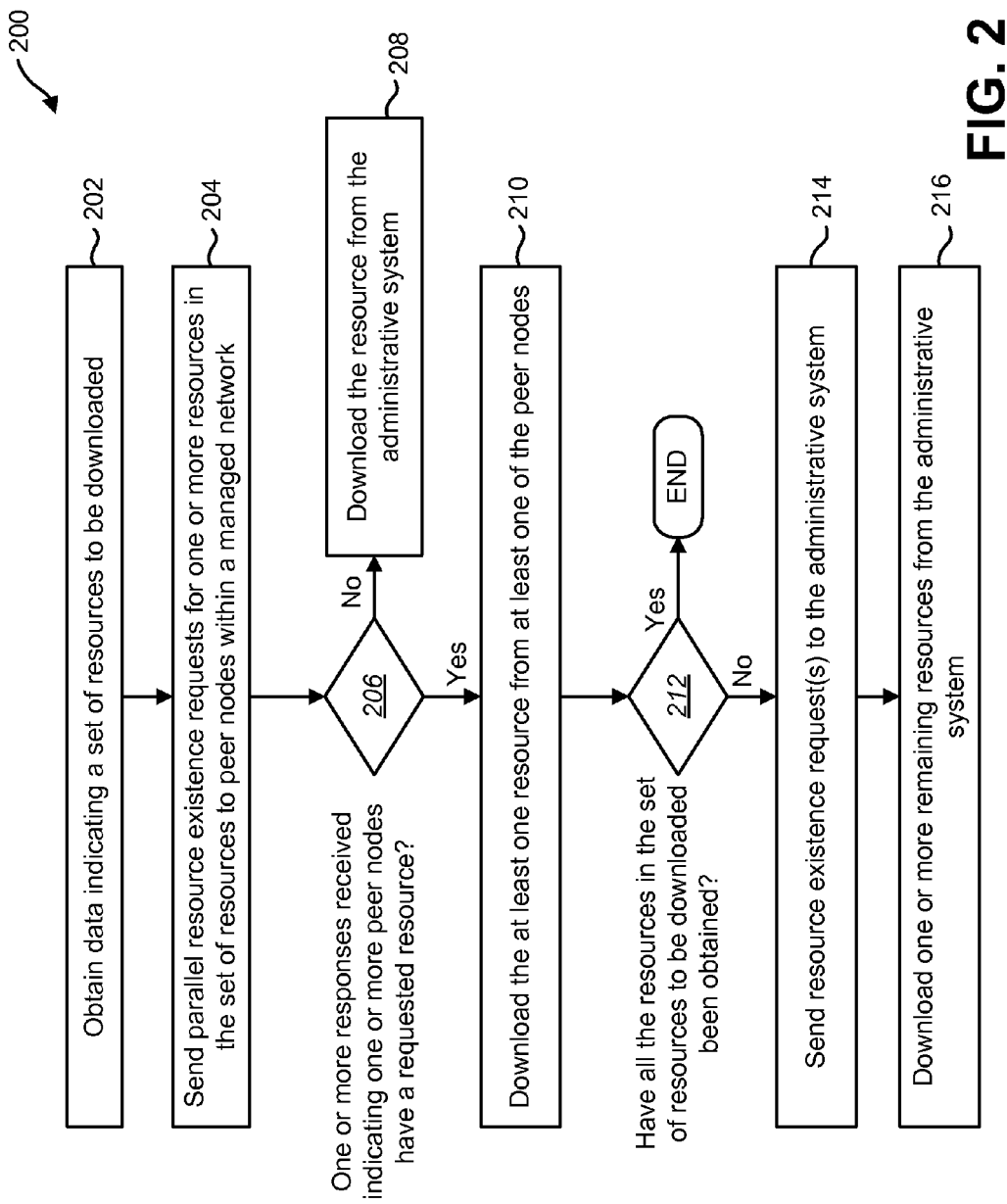
FIG. 2 is a flow diagram illustrating one configuration of a method for provisioning a managed node.

FIG. 2 is a flow diagram illustrating one configuration of a method 200 for provisioning a managed node 120. The method 200 may be performed by a managed node 120. For example, one or more of the procedures included in the method 200 may be performed by a management agent 122 on a managed node 120.

The managed node 120 may obtain 202 data indicating a set of resources to be downloaded. For example, the managed node 120 may receive the data (e.g., a list) from the administrative system 102, one or more peer nodes 116 and/or from a portable storage device. The data indicating the set of resources may correspond to a designated configuration 108. For example, the set of resources may mirror a computer (e.g., a peer node) with the designated configuration 108. In some configurations, the administrative system 102 and/or one or more peer nodes 116 may automatically send the data indicating the set of resources when a new managed node 120 (e.g., an unrecognized node) is connected to the computer network 114. For example, the administrative system 102 may detect that the managed node 120 is not provisioned according to the designated configuration 108 and/or that the managed node 120 needs to obtain the set of resources in order to be properly provisioned to mirror the designated configuration 108. In another example, a managed node 120 may connect to a managed network for a first time and request the data indicating the set of resources and/or verification from an administrative system 102 and/or one or more peer nodes 116 indicating whether the managed node 120 is provisioned according to the designated configuration 108.

The managed node 120 may send 204 parallel resource existence requests for one or more resources 118 in the set of resources 118 to peer nodes 116 within the managed network. For example, the managed node 120 (e.g., management agent 122) may broadcast a resource existence request to all of the peer nodes 116 in the managed network. Additionally or alternatively, the managed node 120 may multicast or unicast a resource existence request to one or more of the peer nodes 116 in the managed network. In some configurations, the resource existence requests may be a multicast packet that is broadcast to all peer nodes 116 on the network (e.g., managed network). For example, resource existence requests may be multicast or broadcast, either of which may reach multiple peer nodes 116 in one send operation. In some approaches, the first peer node 116 to respond to the resource existence request may send the resource 118 (to the managed node 120).

The resource existence request may identify one or more resources 118 (e.g., files, programs, applications, data, etc.). In some configurations, the resource existence request may include one or more file names, path locations, file sizes, file times and/or file dates. For example, the resource existence request may include a file size and file date to ensure (with a high level of confidence, for instance) that a particular file is the correct file. In some configurations, the resource existence request may also include a file hash to ensure (with greater certainty, for instance) that a particular file is the correct file. For example, if the file hash included in the resource existence request matches the resource 118 (e.g., file) on the peer node 116, the peer node 116 may determine with certainty that a particular file is the correct file (e.g., that a resource 118 matches the request). It should be noted that the file hash is optional, since it may add overhead to the processing of the hash. In some cases, given the number of files requested, utilizing a file hash may slow the entire operation. In some configurations, the location on the managed node 120 where the requested resource 118 is to be saved may be included in the resource existence request. Additionally or alternatively, the response by the peer node 116 may include the location where the requested resource 118 is stored on a drive.

In accordance with the systems and methods disclosed herein, a managed node 120 may be able to obtain any file from a peer node 116 (if the file matches a requested file, for instance). For example, the resource existence request may indicate the relative path from the root of a drive on the peer node 116 where the operating system (OS) is installed. In some configurations, one or more macros may be passed that indicate a location on the drive that may be installation dependent. For example, a macro may be sent (from a managed node 120 and/or administrative system 102) to one or more peer nodes 116 in a resource existence request or separately from the resource existence request. For instance, the request may include a macro that indicates a system folder and a relative path under the system folder. Additionally or alternatively, the request may include a macro for the Windows folder (that may be under a different drive, for example). In some cases, for instance, the managed node 120 being provisioned may need to build the OS on the C drive, although the pre-OS was installed on the D drive. The macro may build a path that makes sense on the peer node 116 so the peer node 116 can check for the existence of a file. As described herein, the request may include a file time, file size and/or a hash of the file so the peer node 116 may verify that it 116 has a matching file. In some configurations, the resource existence request may include a relative path to a file in a cache directory.

One or more of the peer nodes 116 may receive the request and determine whether the requested resource(s) is included on the peer node(s) 116. For example, a broadcast request may be sent to all peer nodes 116 located within the managed network. Any peer node 116 may be allowed to respond. In some configurations, only the peer nodes 116 that currently have a requested resource 118 that is identified in the parallel resource existence requests will respond to the parallel resource existence requests. For example, one or more peer nodes 116 may not respond at all if they do not have the resource. Additionally or alternatively, a peer node 116 may maintain a blacklist and/or whitelist of peer nodes (e.g., one or more peer nodes 116 and/or the managed node 120). For example, a peer node 116 may not respond to a resource existence request from a managed node 120 on the blacklist. Additionally or alternatively, a peer node 116 may respond only to resource existence requests from peer nodes (e.g., one or more peer nodes 116 and/or the managed node 120) on the whitelist. In known approaches, a managed node 120 is provisioned from an administrative system 102. These approaches can be particularly time consuming if there are many resources 118 to be downloaded or the link to the administrative system 102 is slow and/or is at a remote location. In another possible configuration, if the managed node 120 has received a response from a peer node 116 indicating that at least one requested resource (e.g., one or more of the requested files) is included on the peer node 116, the managed node 120 may switch from sending one or more broadcast or multicast requests to sending one or more point to point requests to the peer node 116. This may avoid making one or more of the other (e.g., all) peer nodes 116 deal with one or more multicast and/or broadcast requests.

The managed node 120 may determine 206 whether one or more responses from the peer nodes 116 are received. For example, one or more responses may indicate that one or more peer nodes 116 within the managed network 100 have a requested resource 118. In some configurations, if a peer node 116 has a requested resource 118, the peer node 116 may send a response that specifies the resource 118. Accordingly, a response may explicitly specify the requested resource 118. In some configurations, the response from the peer nodes 116 may include one or more file names, path locations (e.g., relative path), file sizes, file times and/or file dates. This information may allow the peer node 116 to indicate that the peer node 116 has the requested resource 118. The response from the peer nodes 116 may optionally include a file hash (if known, for example) to ensure the proper resource is located. In some configurations, the response may include a current file size (for cases in which a peer node 116 only has part of a file, for example), file time and/or file size that will be set for the file when the peer node 116 obtains the complete file.

If a response to the parallel resource existence requests indicating one or more peer nodes 116 has a requested resource 118 is received, the managed node 120 may download 210 at least one resource 118 from at least one of the peer nodes 116. In some configurations, if multiple responses to the parallel resource existence requests are obtained from multiple peer nodes 116 for a single resource 118, the managed node 120 may download the single resource 118 from the first peer node 116 to respond or from the peer node 116 that meets a criterion of a resource priority utility.

In some configurations, if it is determined 206 the managed node 120 does not receive a response to the parallel resource existence requests indicating that one or more peer nodes has a requested resource 118, the managed node 120 may optionally download 208 the resource from the administrative system 102. For example, the managed node 120 may send a resource existence request for the resource to the administrative system 102. The managed node 120 may then download 208 the resource from the administrative system 102 over the administrative link 112. In other configurations, the managed node 120 may log the requested resource for later download from the administrative system 102.

The managed node 120 may determine 212 whether all of the resources 118 in the set of resources to be downloaded have been obtained from responding peer nodes 116 within the managed network 100. For example, the managed node 120 may determine whether any logged resources remain after requesting all of the resources from the peer node(s) 116. If all of the resources have been obtained, operation may end.

If the managed node 120 determines 212 that not all of the resources in the set of resources have been obtained, the managed node 120 may send 214 one or more resource existence requests to an administrative system 102 for the one or more resources (e.g., remaining resources) that were not obtained from the peer node(s) 116 within the managed network 100. For example, the managed node 120 may determine whether all of the resources 118 in the set of resources have been downloaded by logging a list of resources that are not obtained from peer nodes 116 within the managed network 100 when the peer nodes 116 do not respond to requests for a resource. The managed node 120 may download 216 one or more remaining resources 118 from the administrative system 102. For example, the managed node 120 may download 216 any logged resources that were not successfully downloaded from a peer node 116. It should be noted that one or more of the procedures of the method 200 described in connection with FIG. 2 may be repeated, omitted and/or performed in a different order than the order illustrated.

In some configurations, the managed node 120 may download files from different sources that constitute a resource. For example, an operating system may include many different files. The managed node 120 may download one or more files for the operating system from one or more peer nodes 116 and/or from the administrative system 102. Accordingly, although portions (e.g., files) of the operating system are obtained from different sources, the managed node 120 may utilize these files from different sources to install the operating system.

In some configurations, the managed node 120 may balance downloading from different sources. For example, if multiple peer nodes 116 have indicated that they have a requested resource, the managed node may prioritize downloads from a peer node 116 with a lighter load. For instance, if a first peer node 116 is in the process of sending greater than a threshold (e.g., large) amount of data (e.g., a cumulative amount of data, a number of files, etc.) to the managed node 120, the managed node 120 may prioritize downloading a resource (or a portion of a resource, such as one or more files, for example) from a second peer node 116. In this way, the managed node 120 may distribute traffic and/or processing load between peer nodes 116.

Figure 3:
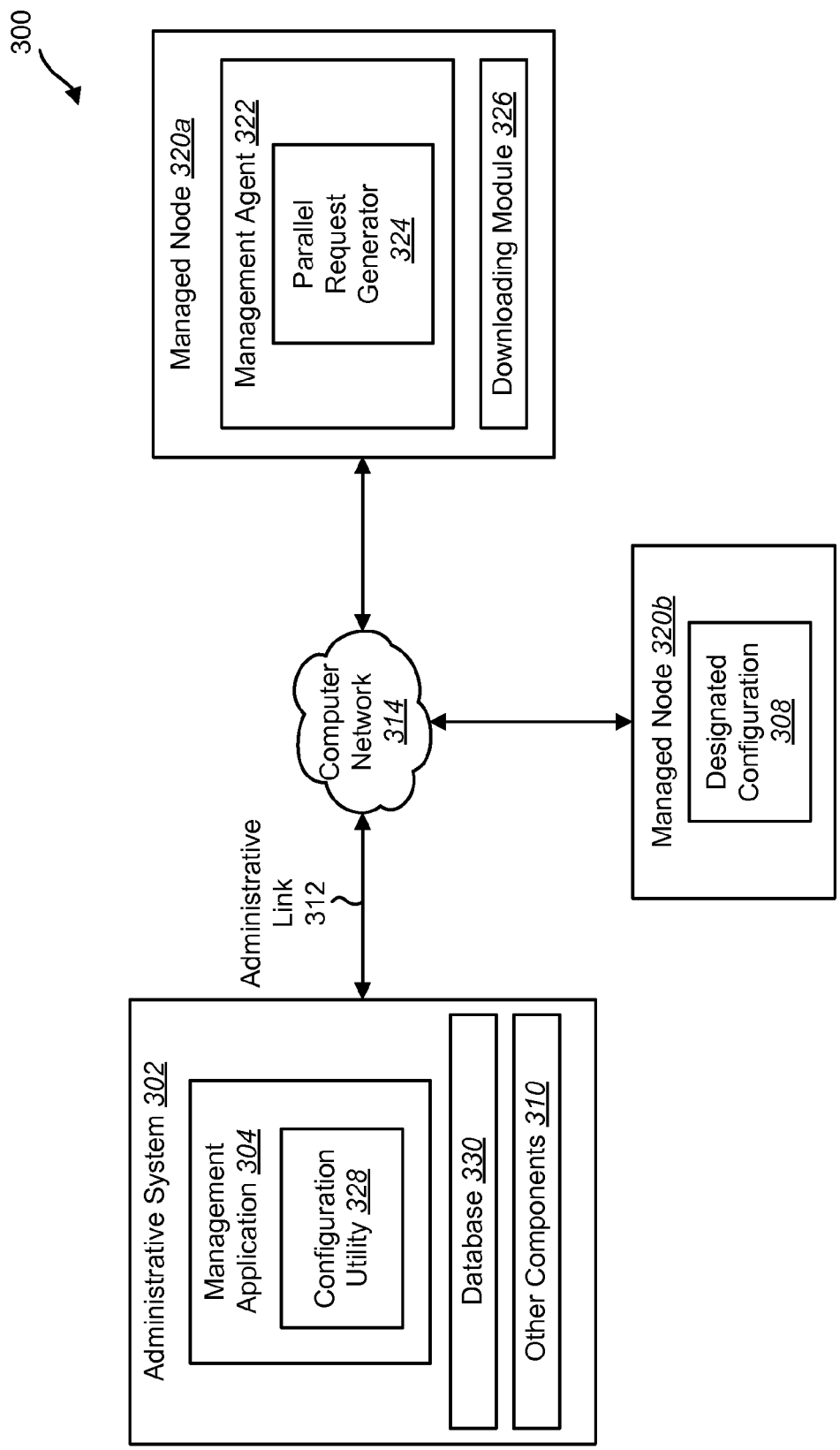
FIG. 3 is a block diagram illustrating another configuration of a managed network in which some configurations may be implemented.

FIG. 3 is a block diagram illustrating another configuration of a managed network 300 in which some configurations may be implemented. The managed network 300 may include an administrative system 302 that is connected to a computer network 314 through an administrative link 312. The administrative system 302 may be used to manage other computing devices that are also connected to the computer network 314. These other computing devices may include one or more managed nodes 320a-b.

The administrative system 302 may include a management application 304. The management application 304 may be used to perform various tasks related to the management of the computer network 314, such as remote control, software distribution, software license monitoring, operating system imaging and migration, IT asset management, problem resolution and so forth. The management application 304 may include a configuration utility 328. The configuration utility 328 may connect to the computer network 314 and query the managed nodes 320a-b to see if any of the managed nodes 320a-b has a designated configuration 308. This query may be done by using a configuration indicator that would indicate to the managed nodes 320a-b a date the designated configuration was created or possibly a checksum value of the designated configuration 308. This indicator may allow the configuration utility 328 to quickly locate a managed node 320a with the designated configuration 308 and obtain data indicating a set of resources 118 to be downloaded for the managed node 320b that is to be provisioned.

The administrative system 302 may be connected and accessed through an administrative link 312. As mentioned in connection with FIG. 1, the administrative link 312 may be a slower link and may have greater latency than a peer link.

To enable the administrative system 302 to perform management tasks via the management application 304, the managed node 320b may include a management agent 322. The management agent 322 may also include a parallel request generator 324. The parallel request generator 324 may be used to send and receive multiple requests and answers simultaneously. An example of a management agent 322 that may be used is the LANDesk® Management Agent.

The managed node 320b may include a downloading module 326. The downloading module 326 may handle the downloading and processing of resources 118 from peer nodes 116, managed nodes 320a and/or an administrative system 302.

An additional managed node 320a may be connected to the same computer network 314 as the managed nodes 320b and the administrative system 302. The additional managed node 320a may include the designated configuration 308 the configuration utility 328 uses to create the data indicating a set of resources 118 to be downloaded by a managed node 320b that is to be provisioned.

Figure 4:
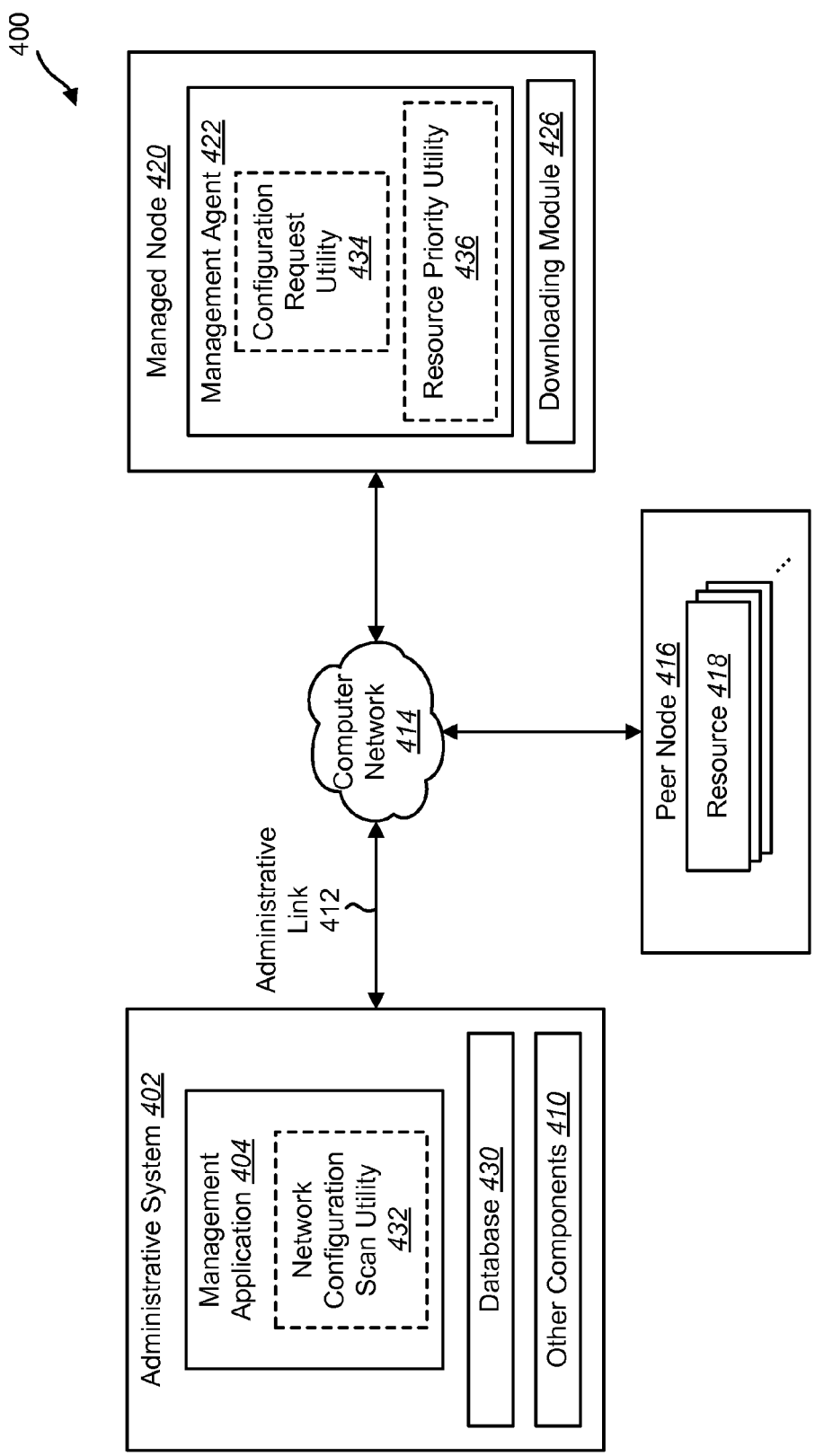
FIG. 4 is a block diagram illustrating another configuration of a managed network in which some configurations may be implemented.

FIG. 4 is a block diagram illustrating another configuration of a managed network 400 in which some configurations may be implemented. The managed network 400 may include an administrative system 402 that is connected to a computer network 414 through an administrative link 412. The administrative system 402 may be used to manage other computing devices that are also connected to the computer network 414. These other computing devices may include one or more managed nodes 420 and one or more peer nodes 416.

The administrative system 402 may include a management application 404. The management application 404 may include a network configuration scan utility 432. The network configuration scan utility 432 may periodically send out provisioning configuration queries to the managed nodes 420 that are connected to the computer network 414. This may be done to allow the administrative system 402 to be aware of the current provisioning configuration status of the managed nodes 420 connected to the computer network 414 and to send data indicating a set of resources 418 to be downloaded by any managed node 420 that is not properly provisioned.

The administrative system 402 may be connected and accessed through an administrative link 412. As mentioned in connection with FIG. 1, the administrative link 412 may be a slower link and may have greater latency than a peer link.

In order for the administrative system 402 to perform management tasks via the management application 404, the managed node 420 may include a management agent 422. The management agent 422 performs management-related tasks in response to requests from the management application 404. The management agent 422 may include a configuration request utility 434, which the management agent 422 may use to verify whether or not the managed node 420 is currently properly provisioned. The configuration request utility could send a request to the administrative system 402 for the data indicating a set of resources 418 to be downloaded. The data could be obtained and then compared to the current resources 418 the managed node 420 has. If there are not any resources 418 missing or any resources 418 that are outdated versions, the managed node 420 may be provisioned properly. If there are any discrepancies between the resources 418 the managed node 420 has and the data obtained through the configuration request utility, the managed node 420 may then request the resources 418 from one or more other managed nodes 420 and/or peer nodes 416 within the managed network 400 before attempting to obtain the resources from the administrative system 402.

The management agent 422 may also include a resource priority utility 436 to prioritize what resources 418 are obtained first. The resource priority utility 436 may prioritize the order of obtaining resources 418 based on the functionality of the resource 418. For example, the set of resources 418 to be downloaded by the managed node 420 may include resources 418 for an operating system and resources 418 for an application. The resource priority utility 436 may determine the resources 418 for the operating system are higher priority and obtain these resources 418 before the resources 418 for the application. The resource priority utility 436 may also have a program that can decide what resource 418 types are of higher priority than other resource 418 types.

The managed node 420 may include a downloading module 426. The downloading module 426 may be used to manage the process of downloading the set of resources 418 to be downloaded by the managed node 420.

A peer node 416 may also be connected to the same computer network 414 as the managed node 420 and an administrative system 402. The peer node 416 may be within the same subnet as the managed node 420 or within a different subnet. A peer node 416 may include one or more resources 418 that the managed node 420 could download to provision the managed node 420.

Figure 5:
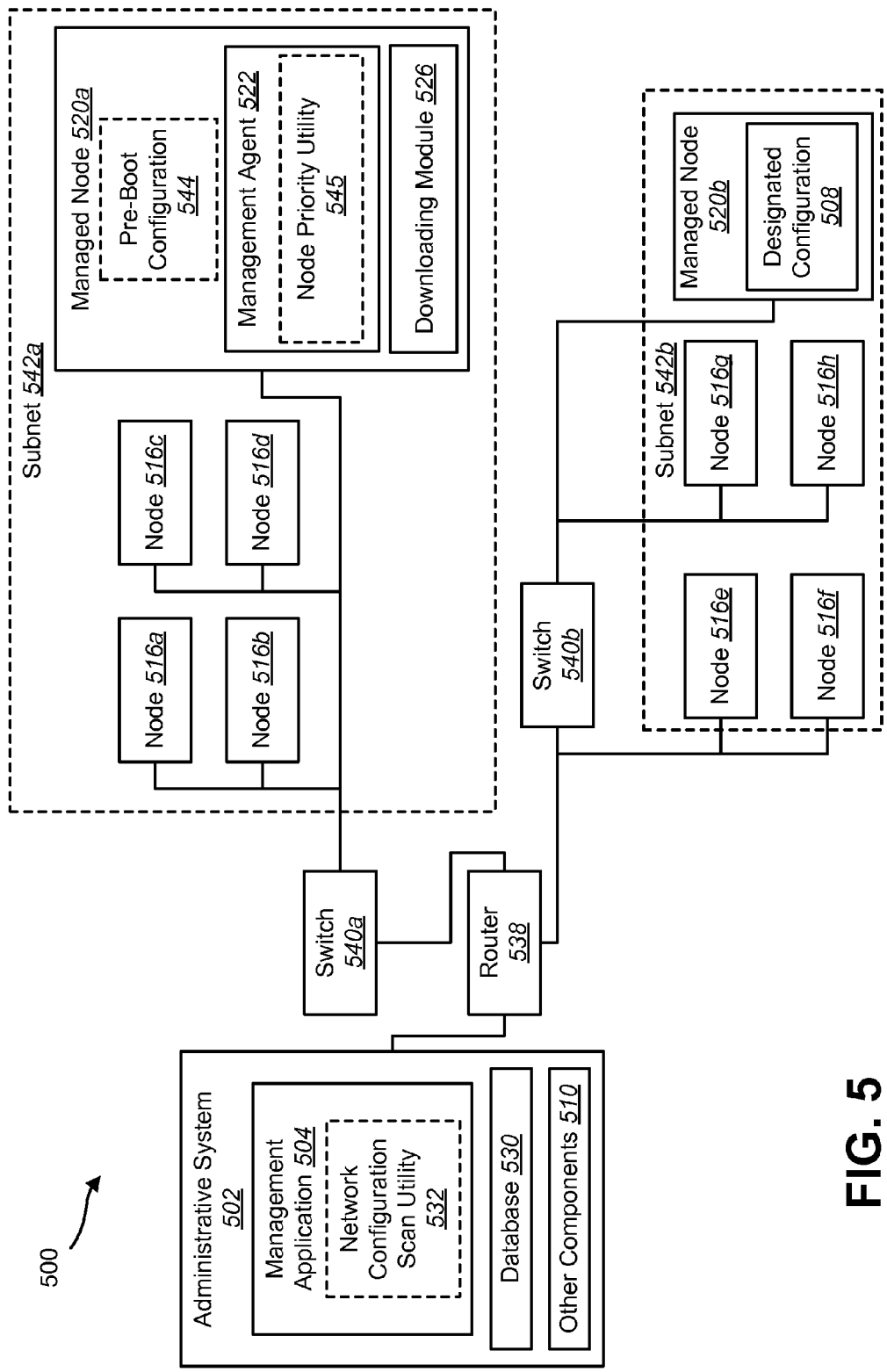
FIG. 5 is another block diagram illustrating an example of a computer network in which the present systems and methods may be implemented.

FIG. 5 is another block diagram illustrating an example of a computer network 500 in which the present systems and methods may be implemented. In FIG. 5, an administrative system 502 connects to a router 538. The router 538 is connected to two switches 540a-b. Each switch 540a-b is connected to four nodes 516a-h and a managed node 520a-b. The nodes 516a-h represent computing devices or devices on the computer network 500.

The administrative system 502 may include a management application 504. The management application 504 may include a network configuration scan utility 532. The network configuration scan utility 532 may periodically send out configuration queries to the managed nodes 520a-b that are connected to the computer network 500. This scan may be done to allow the administrative system 502 to be aware of the current provisioning configuration status of the managed nodes 520a-b that are connected to the computer network 500, and to send data indicating a set of resources 118 to be downloaded by the managed nodes 520a-b to properly provision any managed node 520a-b that is not properly provisioned. The network configuration scan utility 532 may also obtain a designated configuration 508 from a managed node 520b within the computer network 500.

In order for the managed node 520a to be properly provisioned, the managed node 520a may include a pre-boot configuration 544. The pre-boot configuration 544 may be a factory default configuration such as Windows Preinstallation Environment (WinPE), Preboot Execution Environment (PXE) or another first time startup configuration. In one configuration, the pre-boot configuration 544 may be a configuration used on the managed node 520a after a power cycle when the managed node 520a needs to be reconfigured according to a designated configuration 508. The pre-boot configuration 544 may be a configuration where there is no higher operating system and an agent is still able to operate without the higher operating system. This agent may process the data indicating a set of resources 118 to be downloaded by the managed node 520a. The managed node 520a may include a management agent 522. The management agent 522 may include a node priority utility 545. The node priority utility 545 may be used to prioritize downloading resources 118 amongst peer nodes 516a-h. For example, the node priority utility 545 may prioritize nodes based on the nodes' 516a-h response times, the nodes' 516a-h physical location, the nodes 516a-d being located within the same subnet 542a and/or the nodes 516e-h located in a nearby subnet 542b.

In some configurations, provisioning procedures may be manually initiated by a user (e.g., administrator). This may occur when provisioning newly purchased hardware (e.g., managed node 520a). For example, the administrator may boot the managed node 520a in the PXE and may select a set of resources 118 to be downloaded by the managed node 520a in order to be properly provisioned. Additionally or alternatively, the administrator may boot the managed node 520a in the PXE and select a provisioning task to be performed by the managed node 520a. In these cases, the administrative system 502 may not know about (e.g., may not have any information about) the managed node 520a prior to the start of provisioning for the managed node 520a.

The managed node 520a may receive data from the administrative system 502 indicating a set of resources 118 to be downloaded. This data may be used to provision the managed node 520a according to the designated configuration 508.

A managed node 520b within the computer network 500 may include a designated configuration 508. The administrative system 502 may use the network configuration scan utility 532 to search the multiple subnets 542a-b within the computer network 500 for a managed node 520b that has a designated configuration 508. The administrative system 502 may then use the network configuration scan utility 532 to create the data indicating a set of resources 118 to be downloaded by any managed nodes 520a-b in the future that are to be provisioned in accordance with the designated configuration 508.

Figure 6:
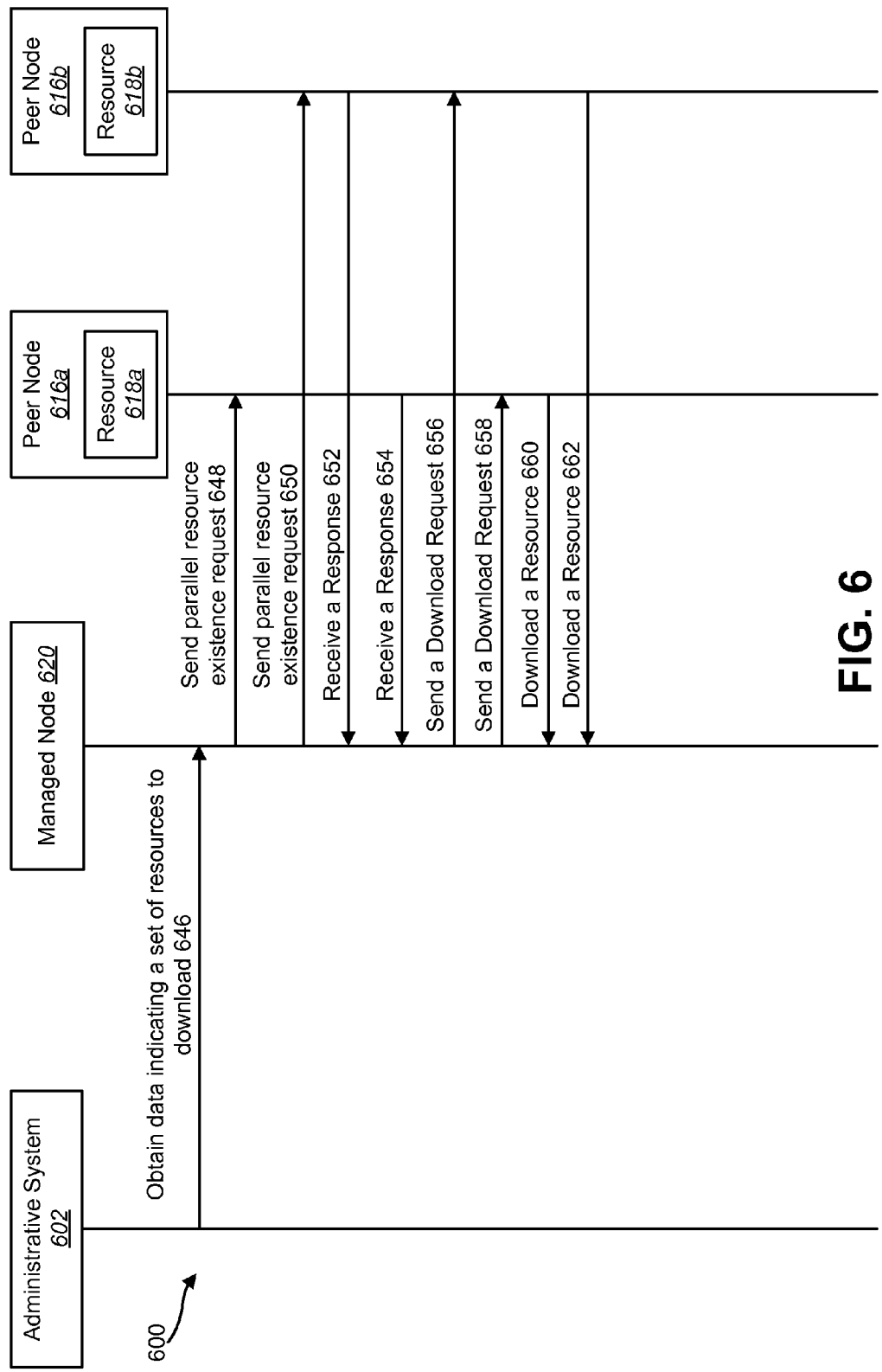
FIG. 6 is a call flow diagram representing one example of provisioning a managed node in accordance with the systems and methods disclosed herein.

FIG. 6 is a call flow diagram representing one example of provisioning a managed node 620 in accordance with the systems and methods disclosed herein. The managed node 620 may obtain 646 data indicating a set of resources 618a-b to download from an administrative system 602. The managed node 620 may avoid potential latency issues by attempting to retrieve the resources 618a-b from the peer nodes 616a-b within the managed network 600 before attempting to retrieve the resources 618a-b from the administrative system 602.

The managed node 620 may send 648, 650 parallel resource existence requests for multiple resources 618a-b to both peer nodes 616a-b. The managed node 620 may receive 652, 654 responses from the peer nodes 616a-b. In some configurations, if a peer node 616 does not have a resource, a peer node 616 will not respond to a resource existence request. The responses may indicate the peer nodes 616a-b have one or more resources 618a-b. If the responses indicate the peer nodes 616a-b have one or more requested resources 618a-b, the managed node 620 may send 656, 658 a download request to the peer nodes 616a-b for the resources 618a-b the peer nodes 616a-b have. The managed node 620 may then download 660, 662 the resources 618a-b from the peer nodes 616a-b.

Figure 7:
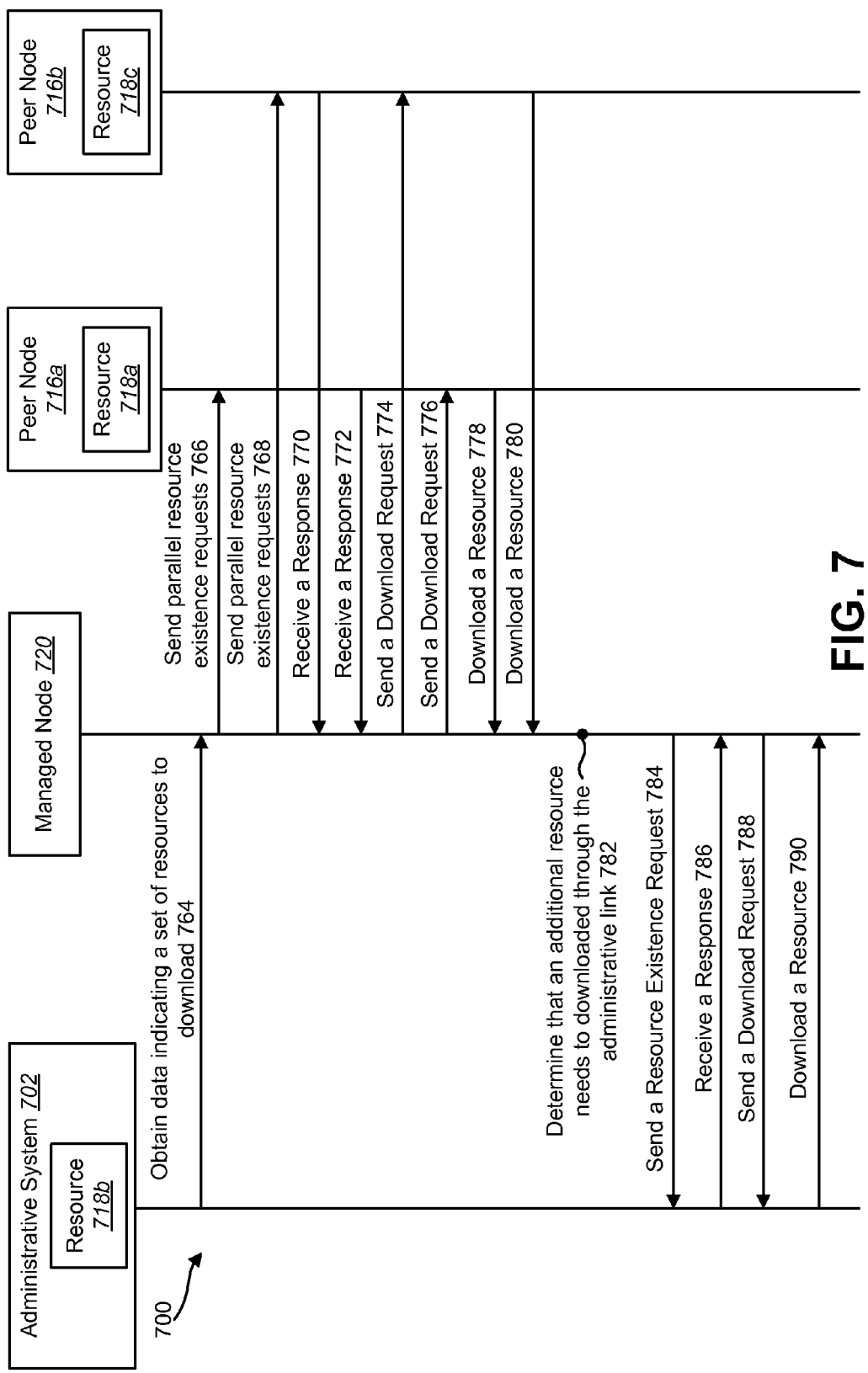
FIG. 7 is a call flow diagram representing another example of provisioning a managed node in accordance with the systems and methods disclosed herein.

FIG. 7 is a call flow diagram representing another example of provisioning a managed node 720 in accordance with the systems and methods disclosed herein. The managed node 720 may obtain 764 data indicating a set of resources 718a-c to download from an administrative system 702. The managed node 720 may avoid potential latency issues by attempting to retrieve the resources 718a-c from the peer nodes 716a-b within the managed network 700 before attempting to retrieve the resources 718a-c from the administrative system 702.

The managed node 720 may send 766, 768 parallel resource existence requests for multiple resources 718a-c to both peer nodes 716a-b. The managed node 720 may receive 770, 772 responses from the peer nodes 716a-b. The responses may indicate that one or more of the peer nodes 716a-b have one or more requested resources 718a, 718c. If the responses indicate the peer nodes 716a-b have one or more requested resources 718a-c, the managed node 720 may send 774, 776 a download request to the peer nodes 716a-b for the resources 718a, 718c the peer nodes 716a-b have. The managed node 720 may then download 778, 780 the resources 718a, 718c from the peer nodes 716a-b.

The managed node 720 may determine 782 that an additional resource 718b needs to be downloaded (e.g., a resource 718b in addition to the resources 718a, 718c obtained from the peer nodes 716a-b). In some configurations, the managed node 720 would request this additional resource 718b from the peer nodes 716a-b within the managed network 700. In this case, the managed node 720 already requested this resource 718b from the peer nodes 716a-b and the peer nodes 716a-b did not indicate having the additional resource 718b.

The managed node may send 784 a resource existence request for the additional (e.g., remaining) resource 718b to an administrative system 702. The managed node 720 may receive 786 a response from the administrative system 702. The response may indicate the administrative system 702 has the additional resource 718b. The managed node 720 may then send 788 a download request for the additional resource 718b to the administrative system 702. The additional resource 718b may then be downloaded 790 by the managed node 720 from the administrative system 702.

Figure 8:
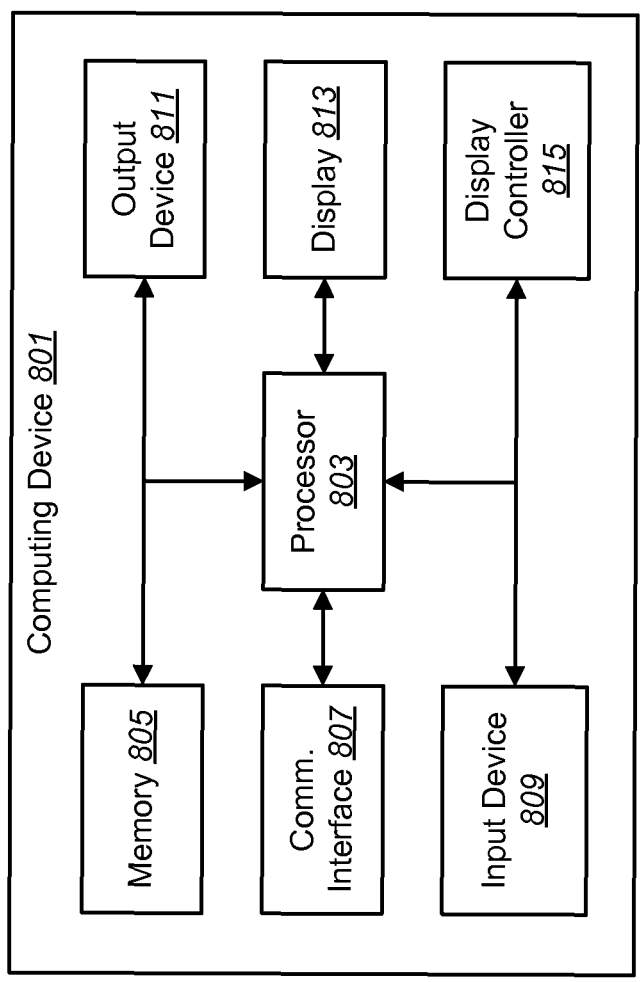
FIG. 8 is a block diagram illustrating various components that may be utilized on a computing device.

FIG. 8 is a block diagram illustrating various components that may be utilized on a computing device 801. The illustrated components may be located within the same physical structure or in separate housings or structures. The computing device 801 described in connection with FIG. 8 may be configured in accordance with one or more of the managed nodes, one or more of the peer nodes and/or the administrative system described above.

The computing device 801 includes a processor 803 and memory 805. The processor 803 controls the operation of the computing device 801 and may be embodied as a microprocessor, a microcontroller, a digital signal processor (DSP) or other device known in the art. The processor 803 typically performs logical and arithmetic operations based on program instructions stored within the memory 805.

As used herein, the term memory 805 is broadly defined as any electronic component capable of storing electronic information, and may be embodied as read-only memory (ROM), random access memory (RAM), magnetic disk storage media, optical storage media, flash memory devices in RAM, on-board memory included with the processor 803, EPROM memory, EEPROM memory, registers, etc. The memory 805 typically stores program instructions and other types of data. The program instructions may be executed by the processor 803 to implement some or all of the methods disclosed herein. The program instructions may also be executable to implement one or more of the methods described herein.

The computing device 801 typically also includes one or more communication interfaces 807 for communicating with other electronic devices. The communication interfaces 807 may be based on wired communication technology, wireless communication technology, or both. Examples of different types of communication interfaces 807 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computing device 801 typically also includes one or more input devices 809 and one or more output devices 811. Examples of different kinds of input devices 809 include a keyboard, mouse, microphone, remote control device, button, joystick, trackball, touchpad, lightpen, etc. Examples of different kinds of output devices 811 include a speaker, printer, etc. One specific type of output device which is typically included in a computing device 801 is a display device 813. Display devices 813 used with the configurations disclosed herein may utilize any suitable image projection technology, such as a cathode ray tube (CRT), liquid crystal display (LCD), light-emitting diode (LED), gas plasma, electroluminescence, or the like. A display controller 815 may also be provided, for converting data stored in the memory 805 into text, graphics, and/or moving images (as appropriate) shown on the display device 813.

Of course, FIG. 8 illustrates only one possible configuration of a computing device 801. Various other architectures and components may be utilized.

Figure 9:
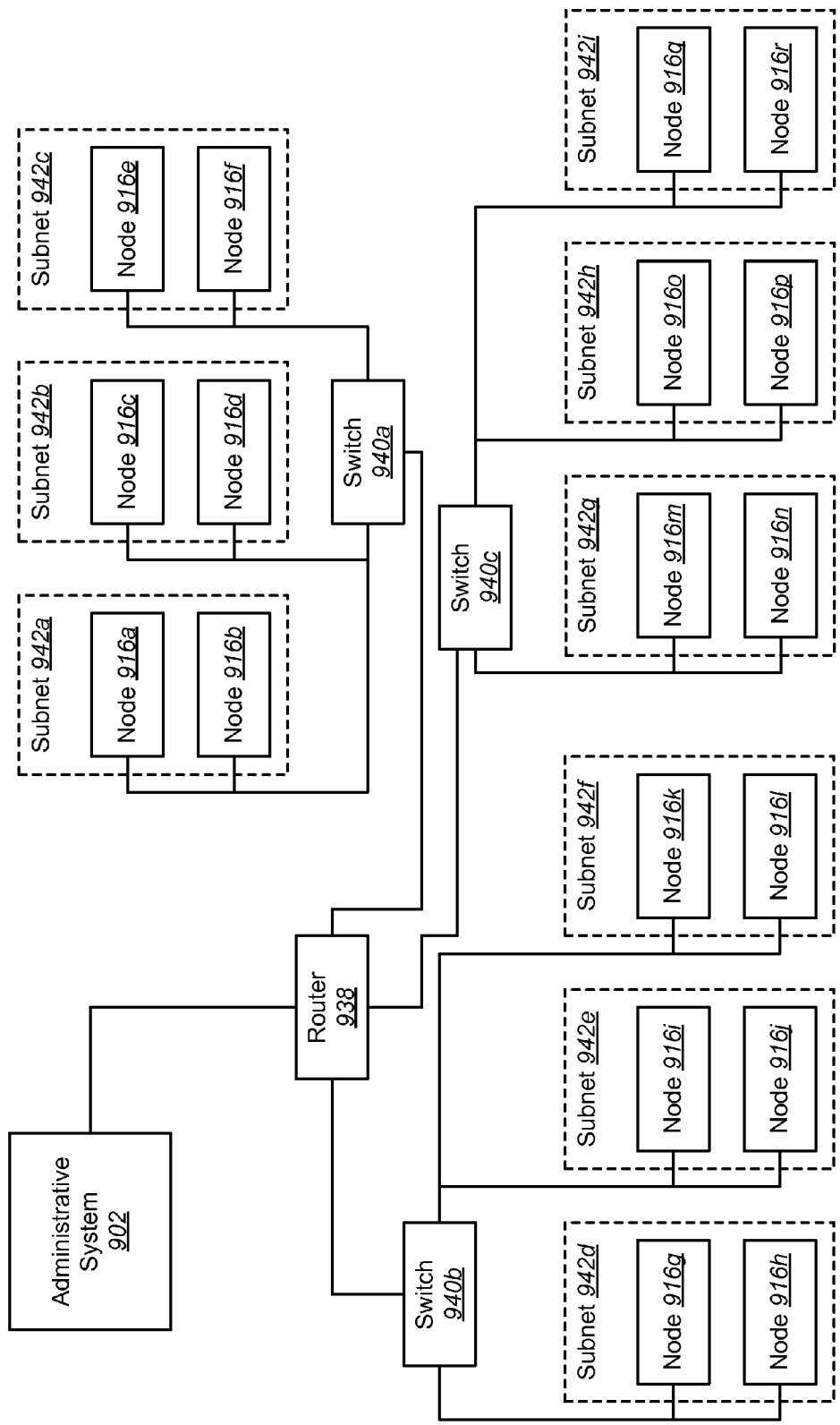
FIG. 9 illustrates a computer network in which configurations of the systems and methods disclosed herein may be implemented.

FIG. 9 illustrates a computer network in which configurations of the systems and methods disclosed herein may be implemented. In FIG. 9, an administrative system 902 connects to a router 938. The router 938 is connected to three switches: 940a-c. Each switch 940a-c connects to three subnets. The first switch 940a connects to three subnets 942a-c. The second switch 940b connects to three subnets 942d-f. The third switch 940c connects to three subnets: subnet 942g-i. Each subnet includes one or more peer nodes 916a-r. The peer nodes 916a-r represent computing devices on the computer network.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the configurations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the configurations disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the configurations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. The storage medium may be a non-transitory tangible computer-readable medium configured with executable instructions to perform one or more of the methods discussed herein.

The methods disclosed herein comprise one or more steps or actions for achieving the described method. The method steps and/or actions may be interchanged with one another without departing from the scope of the present invention. In other words, unless a specific order of steps or actions is required for proper operation of the configuration, the order and/or use of specific steps and/or actions may be modified without departing from the scope of the present invention.

While specific configurations and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for provisioning a managed node, the method comprising:
    obtaining, at the managed node and from a management server, a list of configuration files to be downloaded to provision the managed node, wherein the list of configuration files is associated with a designated configuration of the managed node;
    sending, from the managed node and to a plurality of peer nodes, a plurality of parallel resource existence requests for a plurality of configuration files having identifiers within the list of configuration files, wherein the plurality of parallel resource existence requests are sent within a managed network;

receiving, at the managed node and from a peer node from the plurality of peer nodes, a response to a parallel resource existence request from the plurality of parallel resource existence requests, the response indicating that the peer node includes a first configuration file from the plurality of configuration files;

downloading, at the managed node, the first configuration file from the peer node based on the response;

downloading, at the managed node, a second configuration file from the management server in response to not receiving an indication (1) in response to at least one parallel resource existence request from the plurality of parallel resource existence requests and (2) indicating that at least one peer node from the plurality of peer nodes includes the second configuration file; and provisioning the managed node by executing the first configuration file and the second configuration file at the managed node, wherein the downloading the first configuration file from the peer node improves one of a speed or an efficiency of the provisioning of the managed node.

2. The method of claim 1, wherein the list of configuration files to be downloaded is obtained in response to the managed node connecting to the managed network.

3. The method of claim 1, wherein the peer node is a first peer node from the plurality of peer nodes and the response is a first response to the parallel resource existence request, the method further comprising:

receiving from a second peer node from the plurality of peer nodes, a second response to the parallel resource existence request, the downloading the first configuration file from the first peer node being based on receiving the first response prior to the second response.

4. The method of claim 1, wherein the second configuration file is downloaded through an administrative link.

5. The method of claim 1, wherein the designated configuration is generated by the management server, the management server executing a configuration utility.

6. The method of claim 1, wherein the list of configuration files to be downloaded is generated by the management server, the method further comprising:

receiving, at the managed node, a periodic check for the designated configuration, the obtaining being based on the periodic check indicating that the managed node does not have the designated configuration.

7. The method of claim 1, wherein the list of configuration files to be downloaded is obtained when the managed node is in a pre-boot configuration.

8. The method of claim 1, wherein the peer node is a first peer node from the plurality of peer nodes and the parallel resource existence request is a first parallel resource existence request from the plurality of parallel resource existence requests, the method further comprising:

receiving, from a second peer node from the plurality of peer nodes, a response to a second parallel resource existence request from the plurality of parallel resource existence requests, the response to the second parallel resource existence request indicating that the second peer node includes a third configuration file from the plurality of configuration files; and downloading, at the managed node, the third configuration file from the second peer node based on the response to the second parallel resource existence request.

9. The method of claim 1, wherein the parallel resource existence request includes a hash value associated with the first configuration file, the receiving includes receiving the response to the parallel resource existence request based on the peer node identifying the first configuration file based on the hash value.

10. The method of claim 1, wherein the receiving includes receiving the response to the parallel resource existence request based on the peer node identifying that an identifier of the managed node is on a whitelist of peer nodes.

11. The method of claim 1, wherein the downloading the first configuration file occurs prior to the downloading the second configuration file based on the first configuration file being prioritized over the second configuration file.

12. The method of claim 1, wherein the downloading the first configuration file occurs prior to the downloading the second configuration file based on a function of the first configuration file and a function of the second configuration file.

13. A computing device, comprising:
a processor of a managed node; and
a memory of the managed node in electronic communication with the processor;
instructions stored in the memory, the instructions being executable to:

obtain, from a management server, a list of configuration files to be downloaded to provision the managed node, wherein the list of configuration files is associated with a designated configuration;

send, from the managed node and to a plurality of peer nodes, a plurality of parallel resource existence requests for a plurality of configuration files having identifiers within the list of configuration files, wherein the plurality of parallel resource existence requests are sent within a managed network;

receive, at the managed node and from a peer node from the plurality of peer nodes, a response to a parallel resource existence request from the plurality of parallel resource existence requests, the response indicating that the peer node includes a first configuration file from the plurality of configuration files;

download, at the managed node, the first configuration file from the peer node based on the response;

download, at the managed node, a second configuration file from the management server in response to not receiving an indication (1) in response to at least one parallel resource existence request from the plurality of parallel resource existence requests and (2) indicating that at least one peer node from the plurality of peer nodes includes the second configuration file; and provision the managed node by executing the first configuration file and the second configuration file at the managed node, wherein the download of the first configuration file from the peer node improves one of a speed or an efficiency of the provisioning of the managed node.

14. The computing device of claim 13, wherein the list of configuration files to be downloaded is obtained in response to the computing device connecting to the managed network.

15. The computing device of claim 13, wherein the peer node is a first peer node from the plurality of peer nodes and the response is a first response to the parallel resource existence request, the instructions being further executable to:

receive from a second peer node from the plurality of peer nodes, a second response to the parallel resource existence request, the downloading the first configuration file from the first peer node being based on receiving the first response prior to the second response.

16. The computing device of claim 13, wherein the second configuration file is downloaded through an administrative link.

17. The computing device of claim 13, wherein the designated configuration is generated by the management server, the management server including a configuration utility.

18. The computing device of claim 13, wherein the list of configuration files to be downloaded is generated by the management server, the instructions being further executable to:
receive, at the managed node, a periodic check for the designated configuration, the obtaining being based on the periodic check indicating that the managed node does not have the designated configuration.

19. The computing device of claim 13, wherein the computing device is in a pre-boot configuration when obtaining the list of configuration files to be downloaded.

20. A non-transitory, tangible computer-readable medium for provisioning a managed node, comprising executable instructions for:
obtaining, at the managed node and from a management server, a list of configuration files to be downloaded to provision the managed node, wherein the list of configuration files is associated with a designated configuration of the managed node;
sending, from the managed node and to a plurality of peer nodes, a plurality of parallel resource existence requests for a plurality of configuration files having identifiers within the list of configuration files, wherein the plurality of parallel resource existence requests are sent within a managed network;
receiving, at the managed node and from a peer node from the plurality of peer nodes, a response to a parallel resource existence request from the plurality of parallel resource existence requests, the response indicating that the peer node includes a first configuration file from the plurality of configuration files;
downloading, at the managed node, the first configuration file from the peer node based on the response;
downloading, at the managed node, a second configuration file from the management server in response to not receiving an indication (1) in response to at least one parallel resource existence request from the plurality of parallel resource existence requests and (2) indicating that at least one node from the plurality of peer nodes includes the second configuration file; and
provisioning the managed node by executing the first configuration file and the second configuration file at the managed node,
wherein the downloading the first configuration file from the peer node improves one of a speed or an efficiency of the provisioning of the managed node.

21. The computer-readable medium of claim 20, wherein the second configuration file is downloaded through an administrative link.

\* \* \* \* \*